United States Patent
Mori et al.

(10) Patent No.: US 7,153,890 B2
(45) Date of Patent: Dec. 26, 2006

(54) POROUS RESIN BEAD PRODUCTION METHOD

(75) Inventors: Kenjiro Mori, Ibaraki (JP); Tatsuya Konishi, Ibaraki (JP); Ayako Matsunawa, Ibaraki (JP)

(73) Assignee: Nitto Denko Corporation, Ibaraki (JP)

( * ) Notice: Subject to any disclaimer, the term of this patent is extended or adjusted under 35 U.S.C. 154(b) by 0 days.

(21) Appl. No.: 10/928,831

(22) Filed: Aug. 27, 2004

(65) Prior Publication Data
US 2005/0054742 A1 Mar. 10, 2005

(30) Foreign Application Priority Data
Aug. 29, 2003 (JP) .............................. 2003/307671

(51) Int. Cl.
*C08F 8/12* (2006.01)
(52) U.S. Cl. ........................ 521/146; 521/56; 521/149; 521/150; 521/147; 525/329.5; 526/326; 528/396; 528/425
(58) Field of Classification Search ................ 521/146, 521/157, 149, 150, 147; 528/396, 425; 525/329.5; 526/326
See application file for complete search history.

(56) References Cited

U.S. PATENT DOCUMENTS 5,362,824 A * 11/1994 Furtek et al. ................ 526/114

FOREIGN PATENT DOCUMENTS

| | | |
|---|---|---|
| JP | 52-023193 | 2/1977 |
| JP | 58-210914 A | 12/1983 |
| JP | 04-248819 A | 9/1992 |
| JP | 05-086132 A | 4/1993 |
| WO | WO 95/23816 A1 | 9/1995 |

OTHER PUBLICATIONS

Arshady et al., *Reactive Polymers*, 1: 159-174 (1983).
Deleuze et al., *Journal of the Chemical Society, Perkin Transactions*, 2: 2217-2221 (1995).

* cited by examiner

*Primary Examiner*—Irina S. Zemel
(74) *Attorney, Agent, or Firm*—Leydig, Voit & Mayer, Ltd.

(57) ABSTRACT

The present invention provides, as a resin bead which can be developed for use completely different from the use of conventional polystyrene resin beads, a porous resin bead made from a styrene-hydroxystyrene-divinylbenzene copolymer, which contain a hydroxyl group in an amount of 10–1000 μmol/g, and further, a production method of a porous resin bead made from a styrene-hydroxystyrene-divinylbenzene copolymer, which contains suspension copolymerization of a styrene monomer, an acyloxystyrene monomer and a divinylbenzene monomer using an organic solvent (containing at least hydrocarbon and alcohol) and water, followed by hydrolysis reaction.

4 Claims, No Drawings

POROUS RESIN BEAD PRODUCTION METHOD

FIELD OF THE INVENTION

The present invention relates to a porous resin bead made from a styrene-hydroxystyrene-divinylbenzene copolymer and a production method thereof.

BACKGROUND OF THE INVENTION

As conventional polystyrene porous resin beads, those made from a hydroxystyrene-polyene copolymer (JP-A-52-23193, JP-A-58-210914), those made from a copolymer resin obtained by copolymerization of alkoxystyrene, aromatic polyvinyl and an aromatic vinyl compound (JP-A-5-86132 and U.S. Pat. No. 2,987,949) are known. These porous resin beads have been mainly applied as an ion exchange resin, an adsorbent and the like. For such use, adsorption of as much substances as possible is desired. Therefore, the development guideline of conventional porous resin beads includes imparting as many functional groups as possible and enlarging specific surface area as much as possible, with the hope of enhancing substance adsorbability per unit volume of the porous resin beads.

SUMMARY OF THE INVENTION

The present invention aims at providing a novel porous resin bead having a new action beyond an action of simply adsorbing a greater amount of substances, which can be developed for use completely different from the use of conventional polystyrene resins, by designing the porous resin bead based on a new guideline completely different from the aforementioned conventionally known development guideline, and a production method thereof.

The present inventors have conducted intensive studies for the purpose of solving the above-mentioned objects, and found that a porous resin bead having a particular range of hydroxyl group amount different from that known heretofore and preferably having a particular shape can afford a superior action as a reaction site to efficiently carry out a chemical synthetic reaction, and completed the present invention having the following characteristics.

(1) A porous resin bead comprising a styrene-hydroxystyrene-divinylbenzene copolymer, which comprises a hydroxyl group in an amount of 10–1000 μmol/g.

(2) The porous resin bead of (1), wherein the styrene-hydroxystyrene-divinylbenzene copolymer has the following structural unit (A):

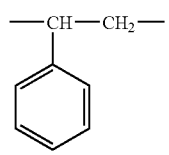

the following structural unit (B):

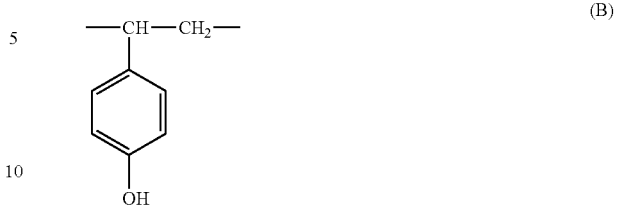

and the following structural unit (C):

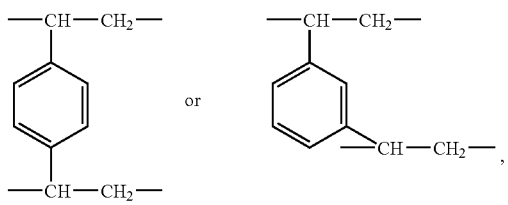

wherein the amount of structural unit (A) relative to the total amount of the structural units (A)–(C) is 60–95 wt %.

(3) The porous resin bead of (1) or (2), which has a specific surface area of 0.1–500 $m^2/g$ as measured by a BET method.

(4) The porous resin bead of any of (1)–(3), which has an average pore size of 0.1–200 nm as measured by a mercury porosimetry.

(5) The porous resin bead of any of (1)–(4), which is used as a synthetic carrier of a nucleotide or a derivative thereof.

(6) A method of producing a porous resin bead, which comprises suspension copolymerizing a styrene monomer, an acyloxystyrene monomer and a divinylbenzene monomer using an organic solvent and water to give a styrene-acyloxystyrene-divinylbenzene copolymer, and hydrolyzing the obtained copolymer to convert the styrene-acyloxystyrene-divinylbenzene copolymer to a styrene-hydroxystyrene-divinylbenzene copolymer, wherein, in the suspension copolymerization, the amount of the acyloxystyrene monomer to the total amount of the styrene monomer, the acyloxystyrene monomer and the divinylbenzene monomer is 0.2–20 wt %, and in the suspension copolymerization, the organic solvent comprises hydrocarbon and alcohol.

(7) The production method of (6), wherein the styrene monomer comprises styrene, the acyloxystyrene monomer comprises p-acetoxystyrene, the divinylbenzene monomer comprises divinylbenzene, and in the suspension copolymerization, the amount of styrene to the total amount of styrene, p-acetoxystyrene and divinylbenzene is 60–95 wt %.

(8) The production method of (6) or (7), wherein, in the suspension copolymerization, a weight of the organic solvent is 0.5 to 2.0-fold of the total weight of the monomers.

(9) The production method of any of (6)–(8), wherein the above-mentioned hydrocarbon is an aliphatic hydrocarbon having 5 to 12 carbon atoms, and the above-mentioned alcohol is an aliphatic alcohol having 5 to 12 carbon atoms.

According to the present invention, a novel porous resin bead can be provided by applying a design guideline different from conventional guidelines, which include controlling a hydroxyl group amount of a styrene copolymer to a particular range. The porous resin bead of the present invention can be applied to various uses. The porous resin bead of the present invention is superior in solvent resistance, acid resistance and alkaline resistance, has sufficient hardness at ambient temperature and has comparatively high strength, wherein the distance between adjacent hydroxyl groups is adjusted by controlling the amount of a hydroxyl group. As a result, a new finding has been obtained that, when chemical synthesis is conducted in the bead, adjacent synthesis reactions cannot be inhibited easily by each other, and consequently, a highly pure synthetic product can be obtained. Thus, the porous resin bead of the present invention is superior as a synthetic carrier of a particular compound, specifically a nucleotide or a derivative thereof.

DETAILED DESCRIPTION OF THE INVENTION

The porous resin bead of the present invention is made from a styrene-hydroxystyrene-divinylbenzene copolymer and has a particular amount of a hydroxyl group. A typical example of the styrene-hydroxystyrene-divinylbenzene copolymer is a copolymer containing the following structural units (A)–(C).

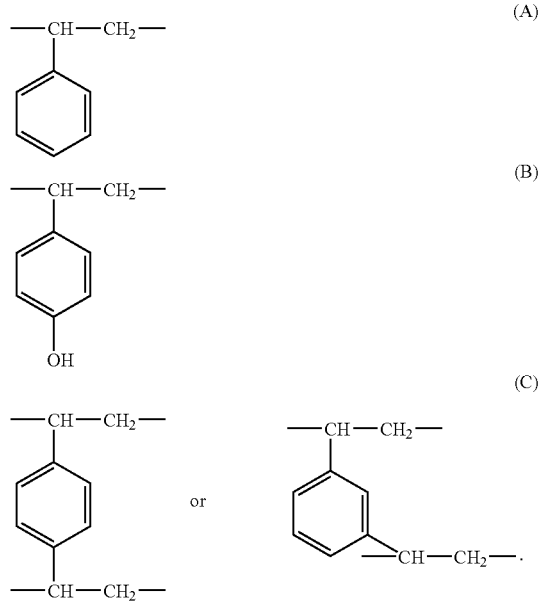

The structural units of the above-mentioned (A)–(C) are contained in the styrene-hydroxystyrene-divinylbenzene copolymer in a typical embodiment of the present invention, and these structural units may be substituted as shown below.

The one or more hydrogen atoms (including hydrogen atom of benzene ring) of the above-mentioned structural unit of (A) are optionally substituted by an alkyl group having 1 to 5 carbon atoms, a halogen atom, an amino group, a carboxyl group, a sulfo group, a cyano group, a methoxy group, a nitro group and the like.

The one or more hydrogen atoms (including hydrogen atom of benzene ring but excluding hydrogen atom of hydroxyl group) of the above-mentioned structural unit of (B) are optionally substituted by an alkyl group having 1 to 5 carbon atoms, a halogen atom, an amino group, a carboxyl group, a sulfo group, a cyano group, a methoxy group, a nitro group and the like. When the obtained porous resin bead is used as a synthetic carrier, in consideration of the easiness of inhibition of the synthesis reaction between adjacent hydroxyl groups, binding of a hydroxyl group to a benzene ring is particularly preferably at the para position of the main chain as in the above-mentioned (B).

The one or more hydrogen atoms (including hydrogen atom of benzene ring) of the above-mentioned structural unit of (C) are optionally substituted by an alkyl group having 1 to 5 carbon atoms, a halogen atom, an amino group, a carboxyl group, a sulfo group, a cyano group, a methoxy group, a nitro group and the like.

The styrene-hydroxystyrene-divinylbenzene copolymer constituting the porous resin bead of the present invention may contain a constitution unit other than the structural units (A)–(C) and substituents thereof.

The hydroxyl group amount of the porous resin bead of the present invention is 10–1000 µmol/g, preferably 50–800 µmol/g, more preferably 100–500 µmol/g. When a porous resin bead having a too small amount of the hydroxyl group is used as a carrier of chemical synthesis of oligonucleotide and the like, the amount of synthesis becomes small. When the hydroxyl group amount is too high, many chemical reactions occur but the purity of the object compound in the reaction product decreases. More specifically, when the hydroxyl group amount is too high, the number of base sequences in the synthesis of oligonucleotide tends to be smaller than the desired number.

The above-mentioned hydroxyl group amount mainly depends on the amount of the aforementioned structural unit (B) (or a substituted form thereof) in a copolymer. The hydroxyl group amount of the porous resin bead of the present invention is measured by titration based on JIS K0070 as mentioned below. To be specific, hydroxyl group of the porous resin bead of the measurement object is acetylated with a known amount of an acetylating agent (acetic anhydride), and an amount of the acetylating agent (acetic anhydride) that was not consumed by acetylation is determined by titration with potassium hydroxide, whereby the hydroxyl group amount of the measurement object is calculated. Specific steps of this measurement are as follows.

Pyridine is added to acetic anhydride (25 g) to the total amount of 100 ml to give an acetylating agent. A measurement sample (0.5–2 g, dry porous resin bead) is weighed in a flask, and the above-mentioned acetylating agent (0.5 ml) and pyridine (4.5 ml) are accurately added. The mixture in the flask is maintained at 95–100° C. for 2 hr, and after allowing to cool to room temperature, distilled water (1 ml) is added. By heating for 10 min, acetic anhydride that was not consumed by acetylation is decomposed. The whole content of the flask is transferred to a beaker, diluted with distilled water to the total amount of 150 ml and the mixture is titrated with 0.5 mol/l of an aqueous potassium hydroxide solution.

Separately, a blank is measured in the same manner as above without a measurement sample.

The hydroxyl group amount of the measurement sample is calculated by the following formula (1), wherein A (µmol/g) is a hydroxyl group amount of the measurement sample, B (ml) is a titer of the aqueous potassium hydroxide solution in the blank measurement, C (ml) is a titer of the aqueous potassium hydroxide solution in the measurement of the measurement sample, f is a factor of the aqueous potassium hydroxide solution and M (g) is the weight of the measurement sample weighed.

$$A=(B-C)\times 0.5(\text{mol/l})\times f\times 1000\div M \qquad (1)$$

The amount of the structural unit (A) to the total amount of the structural units (A)–(C) contained in the styrene-hydroxystyrene-divinylbenzene copolymer constituting the porous resin bead of the present invention is preferably 60–95 wt %, more preferably 70–90 wt %.

To prevent easy occurrence of the inhibition of the synthesis reaction between adjacent hydroxyl groups by setting the hydroxyl group amount of the porous resin bead of the present invention within the above-mentioned range or controlling the hydroxyl group amount, the amount of the structural unit (B) to the total amount of the structural units (A)–(C) contained in the styrene-hydroxystyrene-divinylbenzene copolymer constituting the porous resin bead of the present invention is preferably 0.15–15 wt %, more preferably 1–8 wt %.

To (i) increase synthesis reaction sites by making a bead to have a porous structure, (ii) impart a suitable strength to the bead, (iii) impart a bead (used in a synthesis reaction) with insolubleness in an organic solvent and suitable swellability, the amount of the structural unit (C) to the total amount of the structural units (A)–(C) contained in the styrene-hydroxystyrene-divinylbenzene copolymer constituting the porous resin bead of the present invention is preferably 4–35 wt %, more preferably 5–25 wt %.

One or two amounts of the structural units (A)–(C) to the total amount of the structural units (A)–(C) may be within the above-mentioned range, and particularly preferably, the amount of all the structural units (A)–(C) is within the above-mentioned range.

The size and surface shape of the porous resin bead of the present invention are not particularly limited, and its specific surface area is preferably 0.1–500 m$^2$/g, more preferably 10–300 m$^2$/g, more preferably 50–200 m$^2$/g. When a porous resin bead having a specific surface area that is too small is used as a synthetic carrier, the reaction site of the chemical synthetic reaction becomes small and the amount of the obtained synthesized substance becomes small. Conversely, a greater specific surface area of a porous resin bead can mean a case where a great many micropores have occurred and a case where the porosity has become high. When the micropores are too many, the synthesis reaction may not proceed smoothly when the bead is used as a synthetic carrier, and when the micropore porosity is too high, the bead itself may have lower strength and handling thereof may becomes difficult.

To increase or decrease the specific surface area when forming a porous resin bead, for example, a method comprising control of the specific surface area of a polystyrene resin bead can be appropriately incorporated. A specific method for obtaining a porous resin bead having a specific surface area within the range mentioned above is exemplarily given in Example below. The methods for obtaining a porous resin bead having a large specific surface area are recited in the following.

Increasing the content of structural unit (C) or a substituted form thereof.

Using a higher alcohol as alcohol to be used as an organic solvent for suspension copolymerization.

Adjusting the ratio of the total organic solvent amount and the entire monomer amount during suspension copolymerization to the range mentioned later.

To produce a porous resin bead having a small specific surface area, methods opposite to the above-mentioned methods can be employed.

The specific surface area of the porous resin bead of the present invention can be measured by a BET method.

As an adsorption gas for the BET method, nitrogen gas is used and as a measurement instrument, a specific surface area measuring instrument, NOVA 1200 (manufactured by QuantaChrome Co.) is used. A measurement sample is placed in this instrument, deaerated in vacuo at room temperature for 120 min and the specific surface area of the sample is measured by a BET multi point method.

The "bead" in the porous resin bead means that it has a certain shape, rather than a strictly spherical shape. The porous resin bead is preferably spherical because the packing ratio of the porous resin beads in a synthesis reaction vessel can be increased and the bead does not easily damaged when the bead is used as a synthetic carrier. While the size (volume) of one bead is not particularly limited, it is preferably 1–1000 µm in an average particle size.

The size, number and the like of the pores of the porous resin bead of the present invention are not particularly limited. The size of the pore can be quantified based on an average pore size, and the average pore size of the porous resin bead of the present invention is preferably 0.1–200 nm, more preferably 1–100 nm, most preferably 5–50 nm. When the average pore size of the porous resin bead is too small, and when the porous resin bead of the present invention is used as a carrier of a chemical reaction, the reaction site may become small and a desired reaction may not occur easily, and the number of base sequences in the synthesis of oligonucleotide tends to be smaller than the desired number. Conversely, when the average pore size of the porous resin bead is too large, the frequency of contact of hydroxyl group on the bead surface, which is the above-mentioned reaction site, with a substance involved in the reaction becomes small, which is a disadvantage as a carrier.

To increase or decrease the average pore size when obtaining a porous resin bead, for example, a method comprising control of an average pore size of a polystyrene porous resin bead can be appropriately incorporated. A specific method for obtaining a porous resin bead in the aforementioned range is exemplarily given in Example below. The methods for obtaining a porous resin bead having a large average pore size are recited below.

Increasing the content of structural unit (C) or a substituted form thereof.

In the suspension copolymerization to be mentioned later, increasing the amount of the organic solvent relative to the entire monomer.

To produce a porous resin bead having a small average pore size, methods opposite to the above-mentioned methods can be employed.

The average pore size of the porous resin bead of the present invention can be measured by a mercury porosimetry. To be specific, about 0.2 g of a measurement sample is placed in a mercury porosimeter PoreMaster 60-GT (manufactured by QuantaChrome Co.), an average pore size of the measurement sample is determined from the mercury injection pressure under the conditions of mercury contact angle of 140° and mercury surface tension of 480 dyn/cm.

The production methods of the porous resin bead of the present invention are not particularly limited. A production method comprising suspension copolymerization of each monomer and subjecting the obtained copolymer to hydrolysis is explained in the following. According to this production method, a styrene monomer, an acyloxystyrene monomer and a divinylbenzene monomer are first subjected to suspension copolymerization using an organic solvent and water to give a styrene-acyloxystyrene-divinylbenzene copolymer.

The styrene monomer is styrene or a substituted form thereof, with preference given to styrene. As the substituted form of styrene, a compound wherein one or more hydrogen atoms of styrene are substituted by alkyl group having 1 to 5 carbon atoms, halogen atom, amino group, carboxyl group, sulfo group, cyano group, methoxy group, nitro group and the like can be mentioned.

The acyloxystyrene monomer is acyloxystyrene or a substituted form thereof, with preference given to unsubstituted p-acetoxystyrene. As the substituted form of acyloxystyrene, a compound wherein one or more hydrogen atoms other than acyloxy group are substituted by alkyl group having 1 to 5 carbon atoms, halogen atom, amino group, carboxyl group, sulfo group, cyano group, methoxy group, nitro group and the like can be mentioned. As the acyloxy group, one having 1 to 5 carbon atoms is preferable, more preferably an acetoxy group. The acyloxy group is preferably coordinated at the para position relative to vinyl group.

The divinylbenzene monomer is divinylbenzene or a substituted form thereof, preferably divinylbenzene. As the substituted form of divinylbenzene, a compound wherein one or more hydrogen atoms of divinylbenzene are substituted by alkyl group having 1 to 5 carbon atoms, halogen atom, amino group, carboxyl group, sulfo group, cyano group, methoxy group, nitro group and the like can be mentioned.

The amount of the acyloxystyrene monomer to the total amount of the styrene monomer, acyloxystyrene monomer and divinylbenzene monomer during suspension copolymerization is 0.2–20 wt %, preferably 1–15 wt %, more preferably 2–8 wt %. According to the production method of the present invention, since an acyloxystyrene monomer is finally converted to a structural unit (B), the mixing ratio of the acyloxystyrene monomer influences the hydroxyl group amount of the finally obtained porous resin bead. However, since the degree of hydrolysis to be mentioned later is not always 100%, the amount of the acyloxystyrene monomer does not uniquely determine the hydroxyl group amount of the finally-obtained porous resin bead.

The amount of divinylbenzene monomer in the total amount of the styrene monomer, acyloxystyrene monomer and divinylbenzene monomer during suspension copolymerization is not particularly limited and is preferably 4–35 wt %, more preferably 5–25 wt %. When this amount is large, a copolymer having a rigid network structure is obtained, and therefore, porous resin bead does not swell easily with a solvent and the like, and when the amount is too large, aggregates are easily produced during suspension copolymerization.

In a preferable embodiment, the aforementioned suspension copolymerization is performed in a system containing styrene, p-acetoxystyrene and divinylbenzene as monomers. Here, two vinyl groups of divinylbenzene are respectively present at the para position or meta position. To achieve the aforementioned amounts of the structural units (A)–(C), styrene preferably accounts for 60–95 wt %, more preferably 70–90 wt %, p-acetoxystyrene preferably accounts for 0.2–20 wt %, more preferably 1–15 wt %, and divinylbenzene preferably accounts for 4–35 wt %, more preferably 5–25 wt %, of the total amount of styrene, p-acetoxystyrene and divinylbenzene in suspension copolymerization. The amount(s) of one or two of styrene, p-acetoxystyrene and divinylbenzene may be within the above-mentioned range(s), particularly preferably, all amounts of these three monomers are within the above-mentioned ranges.

The suspension copolymerization is performed by stirring the aforementioned monomers and an organic solvent in water. In the present specification, the "organic solvent" means a solvent other than water in the suspension copolymerization system. In the present invention, the above-mentioned organic solvent includes hydrocarbon and alcohol. As the hydrocarbon, aliphatic saturated or unsaturated hydrocarbon, or aromatic hydrocarbon can be used, which is preferably aliphatic hydrocarbon having 5 to 12 carbon atoms, more preferably n-hexane, n-heptane, n-octane, isooctane, undecane, dodecan and the like. By the co-presence of alcohol during suspension copolymerization, the obtained bead becomes porous. As the alcohol, for example, aliphatic alcohol can be mentioned, wherein the alkyl group preferably has 5 to 12 carbon atoms. As more preferable alcohol, 2-ethylhexyl alcohol, t-amyl alcohol, nonyl alcohol, 2-octanol, decanol, lauryl alcohol, cyclohexanol and the like can be mentioned.

To facilitate production of a porous resin bead having the aforementioned specific surface area, the weight ratio of the amount of an organic solvent to the total amount of monomers (organic solvent/monomer) during suspension copolymerization is preferably 0.5–2.0, more preferably 0.8–1.5. The weight ratio of hydrocarbon and alcohol during suspension copolymerization is appropriately changed according to the specific combination of hydrocarbon and alcohol. For example, when isooctane and 2-ethylhexanol are used, the weight ratio of the two (isooctane/2-ethylhexanol) is preferably 1/9–6/4 to increase the specific surface area of the obtained porous resin bead.

As the method itself of the suspension copolymerization, conventionally known methods may be employed. For example, known dispersion stabilizers such as polyvinyl alcohol and the like, peroxides (polymerization initiator) such as benzoyl peroxide and the like can be used during suspension copolymerization. The reaction conditions for suspension copolymerization can be determined appropriately and, for example, stirring at 60–90° C. for 30 min–24 hr can be mentioned. A styrene-acyloxystyrene-divinylbenzene copolymer can be obtained by such suspension copolymerization. The obtained copolymer is appropriately washed, classified and the like, and then subjected to a hydrolysis treatment described below.

The hydrolysis for converting an acyloxy group of a styrene-acyloxystyrene-divinylbenzene copolymer to a hydroxyl group can be performed by known means and conditions, and an acid catalyst may be used or an alkali catalyst may be used. A specific example of hydrolysis is described in Example below. In the method of the present invention, it is not necessary to convert all acyloxy groups to hydroxyl groups (degree of hydrolysis 100%). The porous resin bead of the present invention can be obtained by the following treatments. During the production, treatments such as drying, classification and the like can be also applied.

The porous resin bead of the present invention can be applied to conventional use such as ion exchange resin, adsorbent and the like, and can be used as a carrier for chemical syntheses. The porous resin bead of the present invention is preferably used for, from the chemical syntheses, the synthesis of nucleotide such as oligonucleotide and the like, or a derivative thereof. In this case, the porous resin bead of the present invention can be used as a solid phase carrier in the synthesis by solid phase phosphoamidite methods and the like using conventional glass bead and the like as a solid phase carrier. An instrument to automatically perform such synthesis is commercially available, and the porous resin bead of the present invention can be directly applied to such automatic instruments. It is assumed that the use of the porous resin bead of the present invention as a solid phase carrier for the synthesis of a nucleotide or a derivative thereof makes adjacent synthesis reaction difficult to be inhibited by each other because of the sufficient distance between the adjacent hydroxyl groups. By this action, an effect of high purity of the obtained synthetic product is expected to be afforded, and the above-mentioned effect can be further enhanced by simultaneously adjusting the specific surface area and the pore size of the porous resin bead.

EXAMPLES

The present invention is explained in detail by referring to example, which is not to be construed as limitative.

(Suspension Polymerization)

A 2 L separable flask equipped with a stirring device having two stainless cross blade impellers (length of blade: 10 cm) was set on a constant temperature water bath. Into this separable flask were placed 48.00 g of polyvinyl alcohol (manufactured by Wako Pure Chemical Industries, Ltd., average degree of polymerization: about 500) and 1600.00 g of distilled water and the mixture was stirred at 200 rpm. Polyvinyl alcohol becomes a dispersion stabilizer during polymerization. A cooling tube and a nitrogen introduction tube were further inserted into this separable flask, and the stirring was continued while flowing cooling water and nitrogen gas at a temperature of the constant temperature water bath of 55° C. to dissolve polyvinyl alcohol.

Separately, divinylbenzene (37.50 g, purity 55%, manufactured by Wako Pure Chemical Industries, Ltd.) (weight of divinylbenzene 20.63 g) was placed in a beaker, which contained styrene (52.8 g, manufactured by Wako Pure Chemical Industries, Ltd.), p-acetoxystyrene (3.52 g, Aldrich). Then, benzoyl peroxide (1.76 g, NYPER BW manufactured by NOF Corporation, containing 25% water) was added to this beaker and allowed to dissolve. 2-Ethylhexylalcohol (73.90 g, manufactured by Wako Pure Chemical Industries, Ltd.) and isooctane (31.70 g, manufactured by Wako Pure Chemical Industries, Ltd.) were further added to this beaker, and the contents of this beaker were placed in the above-mentioned separable flask, after which the temperature of water in the constant temperature water bath was raised to 80° C. over about 30 min while maintaining the rotation speed of the blades of the separable flask at 360 rpm. The mixture was stirred as was for 5 hr and water in the constant temperature water bath was drained to stop the polymerization.

(Washing)

The contents of the above-mentioned separable flask were taken out on a paper filter (TOYO No. 2) in a Buchner funnel (diameter: 15 cm) and suction filtered to give a bead-like product on the paper filter. Then, suction was stopped, hot water was poured onto the product, the mixture was gently stirred with a spatula to wash the product, which was again suctioned to remove hot water. This treatment aims at removing polyvinyl alcohol, and 2 L of hot water was used. Then, suction was stopped and the product was washed with 1 L of distilled water at ambient temperature to lower the temperature thereof. The distilled water was removed by suction. Then, suction was stopped and the product was washed with 2 L of acetone and acetone was removed by suction. Washing with acetone aims at removal of 2-ethylhexyl alcohol and the like and substitution by acetone solvent. The copolymer after washing was transferred to a 3 L beaker and acetone was further added to allow dispersion to a total amount of about 2.2 L.

(Ultrasonic Dispersion)

This beaker was set to an ultrasonic homogenizer (US-600T, manufactured by Nihon Seiki Mfg., Ltd.) and subjected to ultrasonic dispersion at output 400 µA for 10 min. Then, the aforementioned washing was repeated using a Buchner funnel with a paper filter (TOYO No.2). Washing was performed using distilled water (1L), hot water (2L), distilled water (1L) and acetone (1L) in this order.

(Classification)

The product after washing was transferred to a 5 L beaker, acetone was further added to allow dispersion to a total amount of about 1 L. This beaker was stood still to allow precipitation of the product, and after leaving until the precipitate was not disturbed by tilting the beaker, the supernatant acetone was disposed. Acetone was added to this beaker again to the total amount of 1 L, and the operation of standing still and acetone disposal was repeated. The initial standing required about 1 hr but the time became gradually shorter and the standing time for the last repeat (12th repeat) was 30 min.

(Drying)

The contents of the above-mentioned beaker were taken out on a paper filter (TOYO No. 2) in a Buchner funnel (diameter: 15 cm) and suction filtered to give a bead-like product on the paper filter. This product was subjected to preliminary drying (60° C., 15 hr), and then to vacuum drying (1 kPa, 80° C., 3 hr) to give a bead made from a clear and dried styrene-acetoxystyrene-divinylbenzene copolymer.

(Hydrolysis)

Beads (140 g) of the above-mentioned styrene-acetoxystyrene-divinylbenzene copolymer and tetrahydrofuran (933 g, manufactured by Wako Pure Chemical Industries, Ltd.) were placed in a 2 L separable flask to allow dispersion. A T-type blade impeller made of Teflon (trade mark) was inserted into this separable flask, and the separable flask was set on a constant temperature water bath, and the mixture was stirred at 200 rpm. A cooling tube was further inserted into this separable flask, and the stirring was continued while flowing cooling water and maintaining the temperature of the constant temperature water bath of 50° C. Thereafter hydrazine monohydrate (209.9 g, manufactured by Wako Pure Chemical Industries, Ltd.) was added and the mixture was stirred further for 15 hr to allow reaction.

(Washing)

The contents of the above-mentioned separable flask were taken out on a paper filter (TOYO No. 2) in a Buchner funnel (diameter: 15 cm) and suction filtered to give a bead-like product on the paper filter. Separately, distilled water (400 ml), hydrochloric acid (80 ml, Wako Pure Chemical Industries, Ltd.) and tetrahydrofuran (1440 ml) were placed in a beaker and mixed. The above-mentioned suction of the Buchner funnel was stopped, the contents of the beaker was poured onto the bead-like product, and the mixture was gently stirred with a spatula to wash the product, which was again followed by suction to remove the liquid. This treatment aims at removal of hydrazine and the step was repeated until the pH of the liquid to be removed reached 1 (washed with about 1.7 L). The suction was stopped and washing with distilled water and removal of washing solution by suction were repeated until the washing solution became neutral (washed with about 5 L). Further, similar treatments were conducted using acetone (2 L) instead of distilled water.

(Classification)

The product after washing was transferred to a 5 L beaker, acetone was further added to allow dispersion to a total amount of about 2 L. This beaker was stood still to allow precipitation of bead-like product, and after leaving until the precipitate was not disturbed by tilting the beaker, the supernatant acetone was disposed. Acetone was added to this beaker again to the total amount of 2 L, and the operation of standing still and acetone disposal was repeated (3 times). In the final treatment, acetone containing the bead-like product suspended therein was passed through a nylon mesh (90 mesh) and the suspension passed through the mesh was recovered.

(Drying)

The above-mentioned suspension was poured onto a paper filter (TOYO No. 2) in a Buchner funnel (diameter: 15 cm) and suction filtered to give a bead-like product on the paper filter. This product was subjected to preliminary drying (60° C., 15 hr), and then to vacuum drying (1 kPa, 80° C., 60 hr) to give a porous resin bead made from a clear and dried styrene-hydroxystyrene-divinylbenzene copolymer.

(Analysis)

The obtained porous resin bead was measured with a Laser Diffraction Particle Size Analyzer (LA-920 manufactured by HORIBA, Ltd.) and, as a result, an average particle size of 68 μm (CV25%) was obtained.

The bead before and after the hydrolysis treatment was observed with an FT-IR microscope (Magna760/Nic-Plan, manufactured by Therma Nicolet). By comparison of the intensity of peak at 1767 cm$^{-1}$ based on acetoxy group (C=O) and the intensity of peak at 1602 cm$^{-1}$ based on benzene ring (C=C), a degree of hydrolysis of 95% was obtained.

The obtained porous resin bead was subjected to neutralization titration by the aforementioned steps, a hydroxyl group amount of 160 μmol/g was obtained.

The obtained porous resin bead was observed with an SEM (5000–50000× magnification) and found to be a porous bead having almost uniform pore size and distribution.

The obtained porous resin bead was applied to measurement with a BET method by the aforementioned steps, and the specific surface area was found to be 134 m$^2$/g.

The obtained porous resin bead applied to measurement with a mercury porosimetry by the aforementioned steps, and the average pore size was found to be 34 nm.

The porous resin bead of the present invention can be applied to an ion exchange resin, an adsorbent and the like and can also be used as a carrier in chemical syntheses.

This application is based on patent application No. 2003-307671 filed in Japan, the contents of which are hereby incorporated by reference.

What is claimed is:

1. A method of producing a porous resin bead, which comprises
   suspension copolymerizing a styrene monomer, an acyloxystyrene monomer and a divinylbenzene monomer using an organic solvent and water to give a styrene-acyloxystyrene-divinylbenzene copolymer,and
   hydrolyzing the obtained copolymer to convert the styrene-acyloxystyrene-divinylbenzene copolymer to a styrene-hydroxystyrene-divinylbenzene copolymer,
   wherein
   the styrene monomer comprises styrene,
   the acyloxystyrene monomer comprises p-acetoxystyrene,
   the divinylbenzene monomer comprises divinylbenzene,
   in the suspension copolymerization, the amount of styrene to the total amount of styrene, p-acetoxystyrene and divinylbenzene is 60–95 wt %,
   in the suspension copolymerization the amount of the acyloxystyrene monomer to the total amount of the styrene monomer, the acyloxystyrene monomer, and the divinylbenzene monomer is 0.2–20 wt %, and
   in the suspension copolymerization, the organic solvent comprise hydrocarbon and alcohol.

2. The production method of claim 1, wherein, in the suspension copolymerization, a weight of the organic solvent is 0.5 to 2.0-fold of the total weight of the monomers.

3. A method of producing a porous resin bead, which comprises
   suspension copolymerizing a styrene monomer, an acyloxystyrene monomer and a divinylbenzene monomer using an organic solvent and water to give a styrene-acyloxystyrene-divinylbenzene copolymer, and
   hydrolyzing the obtained copolymer to convert the styrene-acyloxystyrene-divinylbenzene copolymer to a styrene-hydroxystyrene-divinylbenzene copolymer,
   wherein,
   in the suspension copolymerization, the amount of the acyloxystyrene monomer to the total amount of the system monomer, the acyloxystyrene monomer and the divinylbenzene monomer is 0.2–20 wt %, and in the suspension copolymerization, the organic solvent comprises an aliphatic hydrocarbon having 5 to 12 carbon atoms, and an aliphatic alcohol having 5 to 12 carbon atoms.

4. The production method of claim 3, wherein, in the suspension copolymerization, a weight of the organic solvent is 0.5 to 2.0-fold of the total weight of the monomers.

* * * * *

UNITED STATES PATENT AND TRADEMARK OFFICE
CERTIFICATE OF CORRECTION

PATENT NO. : 7,153,890 B2  Page 1 of 1
APPLICATION NO. : 10/928831
DATED : December 26, 2006
INVENTOR(S) : Mori et al.

It is certified that error appears in the above-identified patent and that said Letters Patent is hereby corrected as shown below:

Claims

Claim 3, at column 12, line 46, "system monomer" should read --styrene monomer--

Signed and Sealed this

Third Day of July, 2007

JON W. DUDAS
*Director of the United States Patent and Trademark Office*